United States Patent [11] 3,547,401

[72] Inventors Glenn Lee Beall
Gurnee;
Norbert William Ellmann, Chicago, Ill.
[21] Appl. No. 735,283
[22] Filed June 7, 1968
[45] Patented Dec. 15, 1970
[73] Assignee Abbott Laboratories
Chicago, Ill.
a corporation of Illinois

[54] FOLDABLE BELLOWS VALVE
9 Claims, 9 Drawing Figs.
[52] U.S. Cl. .................................................. 251/144,
251/342, 128/214
[51] Int. Cl. ...................................................... F16k 7/18
[50] Field of Search ............................................ 251/342,
331, 144; 222/(Inquired), 528, 529; 128/214

[56] References Cited
UNITED STATES PATENTS
2,343,584 3/1944 Scheele ........................ 251/331

2,746,651 5/1956 Lewis ........................... 222/528X
3,311,268 3/1967 Fields ........................... 128/214X Primary Examiner—William R. Cline
Attorney—Robert L. Niblack ABSTRACT: A valve for sealing a container outlet which includes a wall portion and a bellows portion, the wall and bellows defining a valve chamber and the bellows being foldable within the chamber to seal the container outlet. Sealing is accomplished by the appropriate interrelationship between the bellows and a valve plug. In one embodiment, the plug is disposed in the valve chamber in overlying relationship with the container outlet and includes a stem which projects into the chamber. When the foldable bellows is folded within the chamber, it engages the stem of the plug in a fluidtight manner to thereby seal the valve outlet.

PATENTED DEC15 1970
3,547,401
SHEET 1 OF 2
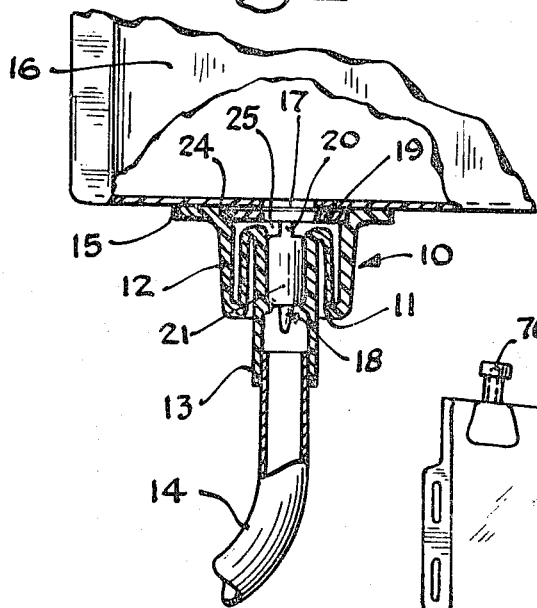
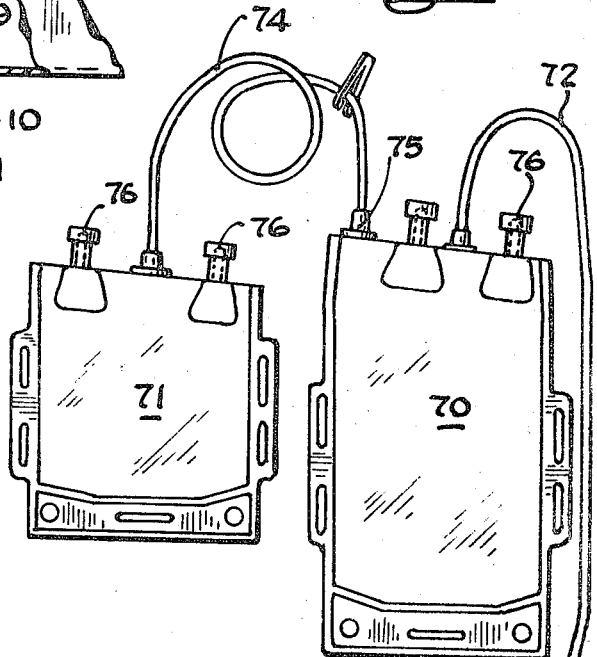
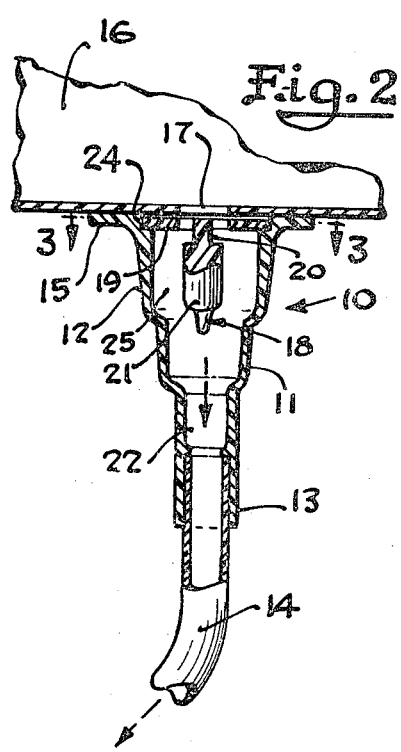
Inventors
Glenn L. Beall
Norbert W. Ellmann
By Gildo E. Fato
Attorney

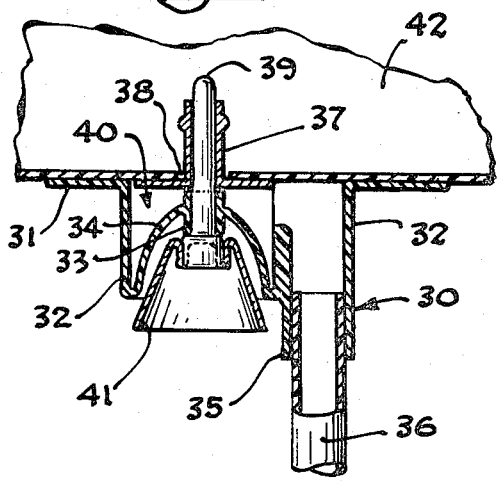
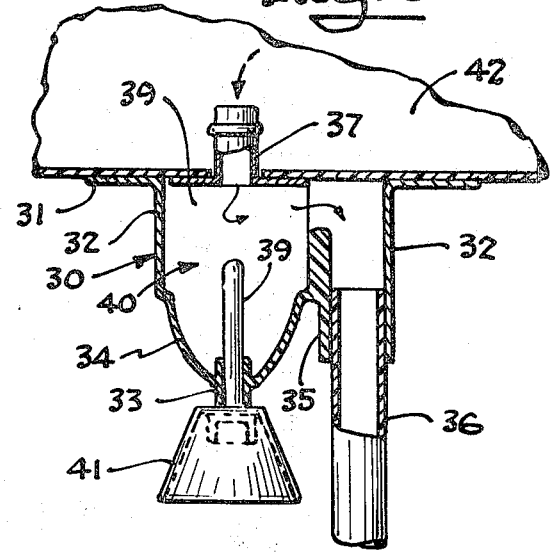
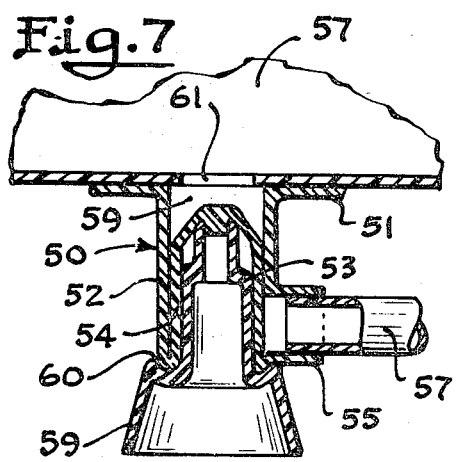
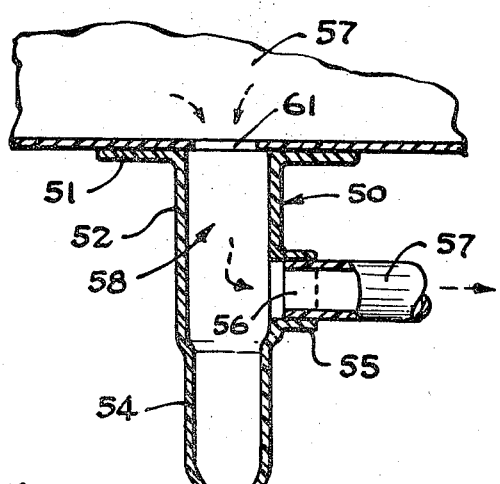
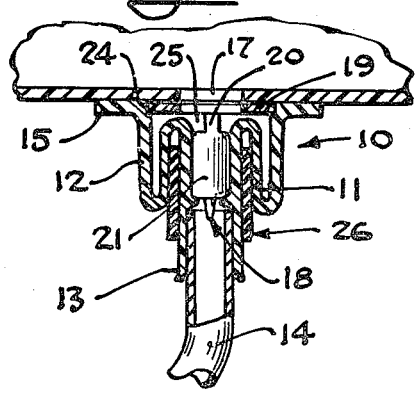
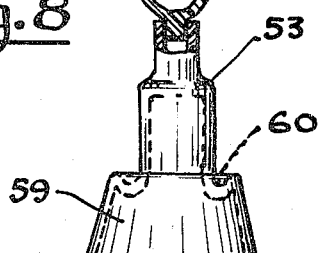
Inventors
Glenn L. Beall
Norbert W. Ellmann
By Gildo E. Fato
Attorney

FOLDABLE BELLOWS VALVE

BACKGROUND OF THE INVENTION

A plastic bag which is employed in the administration of a liquid parenteral solution of whole blood, plasma, or red cells generally has at least one port assembly or outlet. Liquid communication from the bag to the patient or to another bag is established by a tube which is normally connected at one end to the port assembly and at the other end to a hypodermic needle or to another bag. The tube is either integrally connected directly to the port assembly or is suitably connected to the port assembly of the bag by the user shortly before use. To seal the fluid within the bag until it is required, a stainless steel ball valve is generally utilized. Such a valve consists of a stainless steel ball tightly fitted within a tube extending into the bag and in communication with the bag outlet. When it is desired to administer the fluid within the bag, it is necessary to work the steel ball out of the tube and into the bag thereby opening a fluid flow path through the tube and port assembly. Removal of the steel ball is oftentimes difficult, particularly if the plastic is cold. If a fingernail or sharp instrument is used to work the ball out of the tube, damage to the unit may result with possible danger of contamination of the contents.

SUMMARY OF THE INVENTION

The present invention provides a valve, including a plug, for sealing a container outlet and comprising a wall portion and a bellows portion, the wall and bellows defining a chamber. The valve chamber is provided with an inlet and an outlet to permit flow of fluid through the valve when the valve is in the open position. The bellows portion of the valve is foldable within the chamber to seal the container outlet, which sealing is accomplished by the appropriate interrelationship between the bellows and the valve plug. In one embodiment, the plug comprises a flange and a depending stem and is positioned within the valve chamber and in overlying relationship with the container outlet. The plug flange of this particular embodiment is affixed to the container wall and has an annular configuration so that openings are provided for passage of the fluid. Extending from the flange and projecting into the valve chamber is a stem which is of a smaller dimension at the point at which it is affixed to the flange in comparison to the remainder of the stem. When the valve is in the open position, a flow path is thus provided through the openings in the flange of the plug and around the base of the stem. To close the valve, the foldable bellows is folded within the valve chamber in an abutting, fluidtight relationship with the valve stem, thereby effectively sealing the container outlet. In another embodiment, an elongated plug is affixed to the foldable bellows, projecting into the valve chamber. The plug of this embodiment is engageable with a tubular inlet which projects into the container. By folding the bellows within the chamber of the valve, the plug is positioned within the tubular inlet of the valve which also acts as the outlet of the container to thereby seal the container. In a further embodiment, a plug is positioned on the bellows outside the valve chamber. An outlet opening is provided in the wall of the valve so that when the plug is inserted into the chamber the bellows folds around the plug in abutting relationship with the plug and the walls of the valve to thereby seal the valve outlet.

The valves of the present invention greatly simplify the opening of the donor or transfer ports of blood collection and transfer units, since the valves are opened by merely withdrawing the foldable bellows from the valve chamber. For such units, the valves provide a closed system, thereby maintaining the desirable feature of the stainless steel bead valves previously described. Because of the foldover feature, the possibility of leakage from the container is considerably reduced in comparison to the stainless steel bead valves. The valves can be injection-molded either in one piece or component parts can be fabricated and assembled by solvent sealing. The valve body can be molded in polyvinylchloride, and the plug portion can be molded in polyvinylchloride, polycarbonate, or polypropylene. Alternatively, the entire valve can be made of rubber or other resilient material.

DRAWINGS

The invention will be better understood upon consideration of the following description with reference to the drawings, in which:

FIG. 1 is a side elevation view, in section, of one embodiment of the invention and showing the valve in the closed position.

FIG. 2 is a side elevation view, in section, of the valve of FIG. 1 showing the valve in the open position.

FIG. 3 is a top elevation view of the plug portion of the valve of FIG. 1.

FIG. 4 is a side elevation view of a two-container blood collection and transfer unit having a valve of the present invention incorporated therein.

FIG. 5 is a side elevation view, in section, of another embodiment of the invention and showing the valve in the closed position.

FIG. 6 is a side elevation view, in section, of the valve of FIG. 5 as shown in the open position.

FIG. 7 is a side elevation view, in section, of an alternative embodiment of valve from that illustrated in FIGS. 1 and 2 and FIGS. 5 and 6.

FIG. 8 is a side elevation view, in section, of the valve of FIG. 7 shown in the open position.

FIG. 9 is a side elevation view, in section, of a modification of the valve of FIG. 1 and showing the valve in the closed position.

DETAILED DESCRIPTION

Referring to FIGS. 1 and 2 of the illustrative drawings, there is shown a valve 10 made in accordance with one embodiment of the present invention and comprising a foldable portion or bellows 11 interposed between a wall 12 and a sleeve portion 13 into which is fitted the end of a flexible tube 14, for example. As illustrated, the valve 10 includes a base 15 which is affixed to a container 16 and is positioned in overlying relationship to the outlet 17 to seal the outlet 17 of the container 16 when in the closed position as illustrated in FIG. 1. The wall 12 of the valve 10 defines a valve chamber 25 which is further defined by the bellows 11 and seat 22 when the valve is in the open position as illustrated in FIG. 2. In this embodiment, the bellows 11 is folded over a plug 18 in fluidtight relationship to thereby prevent the flow of fluid from the container 16 into the tubing 14. The plug 18 comprises a flange 19 having an annular configuration and bridged at about the center line thereof by a rectangular block portion 20. Extending from the rectangular block portion 20 of the base 19 and projecting into the valve chamber is a cylindrical stem 21 which, when the valve is closed, fits into a seat 22 in the sleeve portion 13 of the valve 10 to thereby seal the container 16. The annular base 19 and rectangular block 20 of the plug 18 define openings 23 which, when the valve 10 is put in place on the container 16, coincide with the container outlet 17 and thereby provide a fluid flow path for the contents of the container 16 when the valve 10 is in the open position as illustrated in FIG. 2.

The valve 10 may be put in place for use by permanently attaching its base 15 to the container 16, concentric with the container outlet 17. The plug 18 is positioned inside the valve base 15 with the openings 23 in the plug flange 19 in line with the container outlet 17. The plug flange 19 can be attached directly to the container 16 or held in contact with the container wall by an annular recess 24 in the valve base 15.

In the closed position illustrated in FIG. 1, the stem 21 of the plug 18 provides a leakproof fit with the seat 22 of the sleeve 13 of the valve 10 since the outer diameter of the stem 21 is substantially equal to the inner diameter of the seat 22. Additionally, when the valve 10 is employed with a flexible plastic container such as a blood collection bag, the tightness of the fit between the plug stem 21 and the seat 22 is enhanced as the bag is filled and pressure builds up in the container. Increased pressure in the container is transferred to the base 15 of the valve 10 which forces the foldable or bellows portion 11 of the valve 10 tighter against the seat 22 thereby effecting a tighter fit between the stem 18 and the seat 22. This effect can be further enhanced by providing a relatively strong valve wall 12 and a weaker bellows wall 11. The security of the fit may be even further enhanced by fabricating the valve 10 of a relatively soft material such as rubber. This will allow the valve 10 to withstand external manipulations without unseating the plug stem 21. When the valve 10, or at least the bellows 11 and sleeve portion 13 thereof, are made entirely of plastic material, the security of the fit may be enhanced by interposing a resilient means between the sleeve 13 and the bellows 11 when the valve is in the closed position. The outer surface of the sleeve 13 may be coated with a nonpermanent adhesive, for example, or, alternatively, a grommet 26 (FIG. 9) of resilient material such as rubber may be fitted over the sleeve 13. When the valve 10 is in the closed position as shown in FIG. 9, the adhesive or resilient grommet 26 will be interposed between the sleeve 13 and the folded bellows 11 and will prevent relative movement between the two portions of the valve. Accordingly, accidental unseating of the plug stem 21 from the seat 22 will be prevented. Resilient means such as a rubber grommet 26 will also aid in preventing leakage of the valve after extended periods of storage. Plastic parts when stored for long periods of time, particularly when under conditions of stress, tend to exhibit cold flow, which is a relaxation of the plastic part so that it does not retain its original position. Thus, if cold flow results in the bellows 11 or sleeve portion 13 of the valve 10, the fit between the valve stem 21 and the seat 22 may loosen slightly and some leakage may occur. The grommet 26, being made of rubber or other resilient material, will retain its elasticity over long periods of time and will therefore ameliorate any tendency of the valve to leak after long storage periods because of cold flow in the plastic parts. The valve 10 is opened by simply pulling on the sleeve 13 of tubing 14 to unfold the bellows 11 and withdraw it from the valve chamber 25. In this fashion, the bellows 11 is removed from its fluidtight relationship with the plug 18 to thereby permit fluid flow through the chamber 25.

Referring to FIGS. 5 and 6 of the illustrative drawings, there is shown a valve 30 made in accordance with another embodiment of the present invention and comprising a base 31, a base wall 32, and a tubular sleeve 33. Interposed between the base wall 32 and the sleeve 33 is a foldable bellows 34. On one side of the valve 30 is located the valve outlet which again comprises a tubular sleeve 35 into which may be inserted, for example, plastic tubing 36 or other conduit. Projecting from the base 31 of the valve is a tubular valve inlet 37 which extends through a container outlet opening 38 and also serves as the container outlet. Inserted into the sleeve 33 is an elongated plug 39 which is engageable with the tubular inlet 37 when the foldable bellows 34 is folded inwardly. The base 31, base wall 32, and bellows 34 define a valve chamber 40. Attached to the sleeve 33 is a pullout pin 41 which may be grasped with the fingers for withdrawing the plug 39 from the tubular valve inlet 37 when it is desired to permit fluid flow through the valve 30. The valve 30 is shown in FIG. 5 in the closed position with the plug 39 inserted into the tubular inlet 37 to thereby block fluid flow into the valve chamber 40 and out through the valve outlet 35. The valve is shown in FIG. 6 in the open position, which is achieved by merely pulling the pullout pin 41 to withdraw the plug 39 from the valve inlet 37. This permits flow of fluid from the container 42 through the valve inlet 37 into the chamber 40 and out the valve outlet 35. The valve 30 may be put in place for use by inserting the tubular valve inlet 37 through the container outlet 38 and permanently affixing the base 31 to the container 42.

Illustrated in FIGS. 7 and 8 is a still further embodiment of the present invention. This valve 50 comprises a base 51, a base wall 52, and a plug 53. Interposed between the base wall 52 and the plug 53 is a foldable bellows portion 54. Positioned on one side of the base wall 52 is an extending tubular sleeve 55 which defines the valve outlet 56. Again, a plastic tube 57 or other conduit may be inserted in the sleeve 55 for transport of the fluid in the container 57. In this embodiment, the valve 50 is closed by pushing the plug 53 into the valve chamber 58 formed by the walls 52. When the valve 50 is in the open position, the chamber 58 is further defined by the bellows 54, as illustrated in FIG. 8. As the plug 53 is inserted into the chamber 58, the bellows portion 54 folds over and is transposed between the plug 53 and the valve wall 52, thereby sealing the valve outlet 56. Again, the valve 50 is opened by withdrawing the plug 53 and bellows 54. As illustrated, the valve 50 includes a pullout pin 59 which is attached to the plug 53. In the pullout pin 59 is formed an annular depression 60 into which fits the valve wall 52 when the valve 50 is in the closed position to provide a compact configuration when the valve 50 is closed and to prevent movement of the plug 53 and bellows 54 in the valve chamber 58. This minimizes possible leakage of fluid through the valve outlet 56. The valve 50 may be put in place for use by permanently affixing its flange 51 to a container 57 in line with the container outlet 61.

The valves previously described are particularly designed for use of flexible plastic containers but are not limited to this use. An example of such use is shown in the multiple-container blood collection and transfer unit illustrated in FIG. 4. Such units permit the collection of blood and the subsequent transfer of whole blood or combinations of plasma, red cells, and platelets. Since the unit provides a closed system, the maximum protection of sterility is provided with no waste of any portion of the blood. Such multiple-container units are utilized whenever it is known in advance that partial units of blood or blood fractions will be desirable. The unit illustrated consists of a primary collection bag 70 and a secondary transfer bag 71. Affixed to and in communication with the primary bag is a length of donor tubing 72 having a needle 73 attached to the distal end thereof. The primary 70 and the secondary 71 bags are connected by an intercommunicating length of tubing 74. A valve 75 which may be any of the embodiments of the present invention previously described is affixed to the primary bag in communication with the transfer tubing 74. At present, a stainless steel bead valve is generally employed for this purpose. In use, blood is collected from a donor through the needle 73 and donor tubing 72 and into the primary collection bag 70. After collection, the donor tubing 72 is sealed off and the complete unit is placed in a centrifuge. If, for example, it is desired to administer plasma, the containers 70, 71 are placed in the centrifuge with the outlet ports 76 uppermost. After centrifuging, the red cells are packed in the bottom of the bag and the plasma is contained in the upper part of the bag. To transfer the plasma from the primary 70 to the secondary or transfer bag 71, the valve 75 is opened and the plasma is transferred through transfer tubing 74 into the transfer bag 71 by applying pressure to the primary bag 70. After transfer of the plasma, the connecting tubing is sealed at a point proximate to both bags and then cut apart between the seals. The plasma in the transfer container 71 or the red cells in the primary container 70 may then be administered separately by making an entry through the suitable port 76 with appropriate administration equipment (not shown).

We claim:

1. A valve including a base and a wall portion, the wall defining a valve chamber, a plug positioned in the base of the valve and including a flange portion and a stem, the flange portion being positioned in the base and having an opening therein to permit fluid flow through the chamber and the base when the valve is in the open position, the stem projecting into the chamber; a foldable bellows extending from the wall and having an opening therein distal from the base the wall and being foldable within the chamber in fluidtight engagement with the stem of the plug to close the chamber and seal the opening in the flange portion of the plug and the foldable bellows to provide one position to thereby prevent fluid flow through the chamber of the valve and being withdrawable from the chamber by the application of axial force to open the chamber and provide a second position permitting fluid flow through the openings in the flange portion of the plug, the chamber and the opening in the bellows portion of the valve.

2. The valve of claim 1 including a sleeve portion extending outwardly from the opening in the bellows and a grommet disposed over the sleeve so that the grommet is interposed between the sleeve and the folded bellows when the valve is in the closed position.

3. A flexible plastic container having an opening therein, a length of tubing affixed to the container and in communication with the opening therein to provide liquid communication into and out of the container, and a valve disposed between the container and tubing in overlying relationship with the container opening to provide liquid communication between the container and the tubing when said valve is in the open position, said valve comprising a base, a wall portion, and a foldable bellows portion, the base, the wall, and the bellows defining a valve chamber, said base having an opening therein positioned in overlying relationship with the container opening, the wall extending from the base and the bellows extending from the wall to thereby define the valve chamber, said chamber having an inlet and an outlet for the flow of fluids therethrough, one being in communication with the container opening and the other with the tubing, the foldable bellows being foldable within the chamber when it is desired to close the valve, and a plug engageable with the bellows and cooperatively operable with the bellows, when the bellows is folded within the chamber, to effectively seal the inlet from the outlet of the chamber and thereby prevent fluid flow through the chamber of the valve.

4. The container of claim 3 wherein the plug of the valve is positioned in the base of the valve and comprises a flange portion positioned in the base and having an opening therein and a stem extending from the flange adjacent said opening in the flange and projecting into said chamber, the bellows being engageable with the stem of the plug in fluidtight relationship to close the chamber when the bellows is folded within the chamber to thereby prevent fluid flow through the chamber of the valve.

5. The container of claim 3 wherein the plug of the valve is positioned in the bellows portion of the valve distal from the walls and the base and projecting into the chamber and wherein the base includes an opening therein in line with the plug, the plug being engageable with the opening in fluidtight relationship therewith when the bellows is folded within the chamber to thereby prevent fluid flow through the chamber of the valve.

6. The container of claim 3 wherein the plug of the valve is positioned in the bellows portion of the valve distal from the walls and the base and projecting outwardly from the chamber and wherein the wall includes an opening therein, the bellows embracing said plug when the plug is inserted within the chamber, the bellows thereupon being disposed between the plug and the walls in a tight relationship and overlying the opening in the wall in a fluidtight manner to effectively seal said opening.

7. A valve for controlling fluid flow from a container and comprising a base, a wall portion, and a foldable bellows portion, the base, the wall and the bellows defining a valve chamber, said base having an opening therein for positioning in overlying relationship with an opening in the container, the wall extending from the base and the bellows extending from the wall to thereby define the valve chamber, the bellows having an opening therein distal from the base and the wall and a plug positioned in the base of the valve and including a stem adjacent the opening in the base and projecting into said chamber, the bellows being engageable with the stem of the plug in fluidtight relationship when the bellows is folded within the chamber to seal the opening in the base and the bellows to thereby close the chamber and prevent fluid flow therethrough.

8. A valve for controlling fluid flow from a container and comprising a base, a wall portion and a bellows portion; the base, the wall and the bellows defining a valve chamber, said base having an opening therein for positioning in overlying relationship with an opening in the container, the wall extending from the base and including an opening therein and the bellows extending from the wall to thereby define the valve chamber, and a plug positioned in the bellows portion of the valve distal from the walls and the base and projecting into the chamber when the valve is in the open position, the plug being engageable with the opening in the base in fluidtight relationship therewith when the bellows is folded within the chamber to seal the opening in the base and the chamber to thereby close the chamber and prevent fluid flow therethrough.

9. A valve for controlling fluid flow from a container and comprising a base, a wall portion and a foldable bellows portion; the base, the wall and the bellows defining a valve chamber, said base having an opening therein for positioning in overlying relationship with an opening in the container, the wall extending from the base and including an opening therein and the bellows extending from the wall to thereby define the valve chamber, and a plug positioned in the bellows portion of the valve distal from the walls and the base and projecting outwardly from the chamber when the valve is in the open position, the bellows embracing said plug when the plug is inserted within the chamber, the bellows thereupon being disposed between the plug and the walls in a tight relationship and overlying the opening in the wall in a fluidtight manner to effectively seal said opening and the chamber.